United States Patent
Gundecha et al.

(10) Patent No.: US 10,664,764 B2
(45) Date of Patent: May 26, 2020

(54) SYSTEMS AND METHODS FOR PREDICTING PERSONAL ATTRIBUTES BASED ON PUBLIC INTERACTION DATA

(71) Applicant: Arizona Board of Regents on behalf of Arizona State University, Tempe, AZ (US)

(72) Inventors: Pritam Gundecha, Tempe, AZ (US); Jiliang Tang, Tempe, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 727 days.

(21) Appl. No.: 15/161,855

(22) Filed: May 23, 2016

(65) Prior Publication Data

US 2017/0004403 A1   Jan. 5, 2017

Related U.S. Application Data

(60) Provisional application No. 62/164,907, filed on May 21, 2015.

(51) Int. Cl.
  *G06N 20/00* (2019.01)
(52) U.S. Cl.
  CPC .................................. *G06N 20/00* (2019.01)
(58) Field of Classification Search
  CPC ............................................... G06N 3/08
  USPC ........................................ 706/12, 13, 21, 25
  See application file for complete search history.

(56) References Cited

U.S. PATENT DOCUMENTS

| | | | | |
|---|---|---|---|---|
| 2011/0082824 A1* | 1/2011 | Allison et al. | ......... | G06Q 10/00 706/20 |
| 2012/0297038 A1* | 11/2012 | Mei | ......... | G06Q 50/01 709/223 |
| 2013/0144818 A1* | 6/2013 | Jebara | ......... | G06Q 50/00 706/12 |
| 2014/0201173 A1* | 7/2014 | Roth | ......... | G06F 16/9535 707/693 |

OTHER PUBLICATIONS

Kotsis, Nikolaos, and Douglas R. McGregor. "Compact representation: An approach to efficient implementation for the data warehouse architecture." International Conference on Data Warehousing and Knowledge Discovery. Springer, Berlin, Heidelberg, 1999. (Year: 1999).*

(Continued)

*Primary Examiner* — Daniel T Pellett
(74) *Attorney, Agent, or Firm* — Polsinelli PC

(57) ABSTRACT

Embodiments of a system for determining personal attributes based on public interaction data are illustrated. In one embodiment, the system employs a process for predicting personal attributes based on public interaction data by constructing matrices based on user interactions drawn from public posts on a social media website. The process may further learn a compact representation for a plurality of users based on public posts using the matrices, extract the compact representation of one or more users that have been labeled, and apply a classifier to learn about a particular personal attribute. Through this, a prediction of personal attributes of users that have not been labeled may be obtained.

20 Claims, 8 Drawing Sheets

(56) References Cited

OTHER PUBLICATIONS

Wu, Xindong, et al. "Data mining with big data." IEEE transactions on knowledge and data engineering 26.1 (2013): 97-107. (Year: 2013).*
Deng, Hongbo, et al. "Exploring and inferring user-user pseudo-friendship for sentiment analysis with heterogeneous networks." Statistical Analysis and Data Mining: The ASA Data Science Journal 7.4 (2014): 308-321. (Year: 2014).*
Conover, Michael D., et al. "Predicting the political alignment of twitter users." 2011 IEEE third international conference on privacy, security, risk and trust and 2011 IEEE third international conference on social computing. IEEE, 2011. (Year: 2011).*
M. Kosinski, D. Stillwell, and T. Graepel, "Private Traits and Attributes are Predictable from Digital Records of Human Behavior,". Proceedings of the National Academy of Sciences, vol. 110, No. 15, pp. 5802-5805, 2013.
A. Mislove, B. Viswanath, K. P. Gummadi, and P. Druschel, "You are who you know: inferring user profiles in online social networks," in Proceedings of the third ACM international conference on Web search and data mining. ACM, 2010, pp. 251-260.
M. McPherson, L. Smith-Lovin, and J. M. Cook, "Birds of a Feather: Homophily in Social Networks," Annual review of sociology, pp. 415-444, 2001.
R. P. Abelson, "Whatever Became of Consistency Theory?" Personality and Social Psychology Bulletin, 9(1), pp. 37-54, 1983.
D. Rao and D. Yarowsky, "Detecting latent user properties in social media," in Proc. of the NIPS MLSN Workshop, 2010.
M. D. Conover, B. Gonc alves, J. Ratkiewicz, A. Flammini, and F. Menczer, "Predicting the political alignment of twitter users," in Privacy, security, risk and trust (passat), 2011 ieee third international conference on and 2011 ieee third international conference on social computing (socialcom). IEEE, 2011, pp. 192-199.
L. Tang and H. Liu, "Relational learning via latent social dimensions,"in Proceedings of the 15th ACM SIGKDD international conference on Knowledge discovery and data mining. ACM, 2009, pp. 817-826.
J. Tang, H. Gao, X. Hu, and H. Liu, "Exploiting homophily effect for trust prediction," in Proceedings of the sixth ACM international conference on Web search and data mining. ACM, 2013, pp. 53-62.
C. Ding, T. Li, W. Peng, and H. Park, "Orthogonal nonnegative matrix trifactorizations for clustering," in Proceedings of the 12th ACM SIGKDD international conference on Knowledge discovery and data mining. ACM, 2006, pp. 126-135.
J. Tang, X. Hu, H. Gao, and H. Liu, "Exploiting Local and Global Social Context for Recommendation," in Proceedings of IJCAI, 2013.
J. Tang and H. Liu, "Feature Selection with Linked Data in Social Media," in SDM, pp. 118-128, 2012.
X. Hu, J. Tang, H. Gao, and H. Liu, "Unsupervised sentiment analysis with emotional signals," in Proceedings of the 22nd international conference on World Wide Web. International World Wide Web Conferences Steering Committee, 2013, pp. 607-618.
T. Li, Y. Zhang, and V. Sindhwani, "A Non-negative Matrix Trifactorization approach to Sentiment Classification with Lexical Prior Knowledge," in Proceedings of the ACL, pp. 244-252, 2009.
Y. Lu, P. Tsaparas, A. Ntoulas, and L. Polanyi, "Exploiting Social Context for Review Quality Prediction," in Proceedings of WWW, 2010.
H. Ma, D. Zhou, C. Liu, M. R. Lyu, and I. King, "Recommender systems with social regularization," in Proceedings of WSDM, 2011.
D. Seung and L. Lee, "Algorithms for Non-negative Matrix Factorization," in Proceedings of the NIPS, 2001.
P. Gundecha, G. Barbier, and H. Liu, "Exploiting Vulnerability to Secure User Privacy on a Social Networking Site," in Proceedings of the 17th ACM SIGKDD, 2011.
L. A. Fast and D. C. Funder, "Personality as manifest in word use: correlations with self-report, acquaintance report, and behavior." Journal of personality and social psychology, vol. 94, No. 2, p. 334, 2008.
S. D. Gosling, S. J. Ko, T. Mannarelli, and M. E. Morris, "A room with a cue: personality judgments based on offices and bedrooms." Journal of personality and social psychology, vol. 82, No. 3, p. 379, 2002.
D. Murray and K. Durrell, "Inferring demographic attributes of anonymous internet users," in Web Usage Analysis and User Profiling. Springer, 2000, pp. 7-20.
J. Hu, H.-J. Zeng, H. Li, C. Niu, and Z. Chen, "Demographic Prediction based on User's Browsing Behavior," in Proceedings of WWW, 2007.
K. De Bock and D. Van den Poel, "Predicting website audience demographics forweb advertising targeting using multi-website clickstream data," Fundamenta Informaticae, vol. 98, No. 1, pp. 49-70, 2010.
S. Goel, J. M. Hofman, and M. I. Sirer, "Who does What on the Web: A Large-scale Study of Browsing Behavior," in Proceedings of ICWSM, 2012.
B. Marcus, F. Machilek, and A. Schutz, "Personality in Cyberspace: Personal Web Sites as Media for Personality Expressions and Impressions," Journal of Personality and Social Psychology, vol. 90, No. 6, pp. 1014-1031, 2006.
P. J. Rentfrow and S. D. Gosling, "The Do Re Mi's of Everyday Life: The Structure and Personality Correlates of Music Preferences," Journal of personality and social psychology, vol. 84, No. 6, pp. 1236-1256, 2003.
D. Quercia, M. Kosinski, D. Stillwell, and J. Crowcroft, "Our Twitter Profiles, Our Selves: Predicting Personality with Twitter," in Proceedings of PASSAT and SOCIALCOM, 2011.
J. Golbeck, C. Robles, M. Edmondson, and K. Turner, "Predicting Personality from Twitter," in Proceedings of PASSAT and SOCIALCOM, 2011.
R. Li, S. Wang, H. Deng, R. Wang, and K. C.-C. Chang, "Towards social user profiling: unified and discriminative influence model for inferring home locations," in Proceedings of the 18th ACM SIGKDD international conference on Knowledge discovery and data mining. ACM, 2012, pp. 1023-1031.
R. Cohen and D. Ruths, "Classifying political orientation on twitter: Its not easy!" in Proceedings of the 7th International Conference on Weblogs and Social Media, 2013.
P. Gundecha et al., "Exploring Personal Attributes from Unprotected Interactions", poster paper, The 10th International AAAI Conference on Weblogs and Social Media (ICWSM2016), May 17-20, 2016. Cologne, Germany.
Zheleva, E., & Getoor, L. (Apr. 2009,). To join or not to join: the illusion of privacy in social networks with mixed public and private user profiles. In Proceedings of the 18th international conference on World wide web (pp. 531-540). ACM.
P. Gundecha, "Managing a User's Vulnerability on a Social Networking Site", PhD dissertation, Arizona State University, Tempe, Arizona, May 2015.

\* cited by examiner

SYSTEMS AND METHODS FOR PREDICTING PERSONAL ATTRIBUTES BASED ON PUBLIC INTERACTION DATA

CROSS REFERENCE TO RELATED APPLICATIONS

This is a non-provisional application that claims benefit to U.S. provisional application Ser. No. 62/164,907 filed on May 21, 2015, which is herein incorporated by reference in its entirety.

GOVERNMENT SUPPORT

This invention was made with government support under W911 NF-11-1-0517 awarded by the Army Research Office. The government has certain rights in the invention.

FIELD

The present disclosure generally relates to personal attributes derived from publicly available interactions, and in particular to a system and method for predicting personal attributes based on public interaction data.

BACKGROUND

Users' interactions are the cornerstone to the popularity of social media, improving a plethora of services related to friend connections, job recommendations, news disseminations, restaurant reviews, product advertisements, and event participations. Users' interactions even played a critical role during the recent events of the "Arab Spring", "Bangladesh Protests", and "Assam Violence", to organize and mobilize protesters, give the latest updates, and spread deceptions. Posts containing violent videos, morphed photos and instigating messages during such events triggered a large amount of user interactions and often led to negative consequences for societies. Recent research shows that users' attributes are predictable providing that their behaviors including interactions are available. To address such privacy concerns, users often use their profile settings to mark their behavior-related data, including demographic profiles, status updates, lists of friends, videos, photos, and interactions on posts, invisible to others, thereby raising a barrier to access by others.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
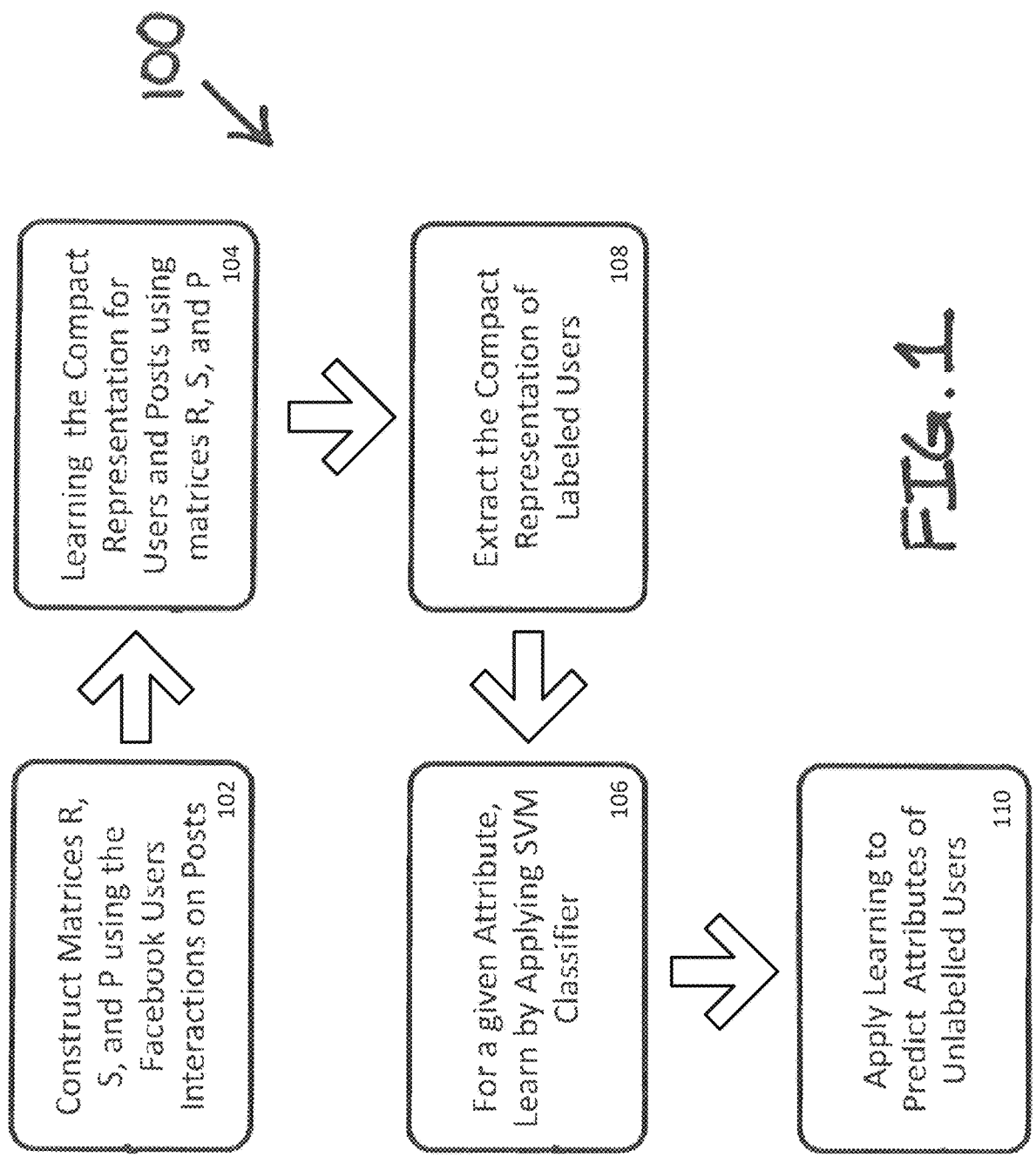
FIG. 1 is a flow chart illustrating one method for processing personal attributes for publicly available interactions.

The present disclosure generally relates to a system that focuses on data which is publicly available and beyond individual users' profile settings. Such data is referred to as publicly available or public data, unless otherwise stated herein. Social media wants users to be more social and at the same time less concerned about unwarranted access to their personal data. Recent social media advancements are creating new opportunities for meaningful interactions among users, while enabling new profile settings for users to better protect their personal information. New mechanisms such as FACEBOOK® page allow users to interact through posts without requiring them to be friends, while keeping their personal information, including demographic profiles, lists of friends, and interactions with friends private. Users' interactions on these pages are often centrally administered and publicly available for everyone. Based on whether a user can control the visibility of her actions, a post can be categorized into two parts: personal or public post. A personal post is a post which can be controlled by a user's individual profile settings; otherwise, it is referred as a public post. Interactions on public posts are public interactions, while the interactions on personal posts are personal interactions. Given the pervasive availability of public interactions, the question may be asked—are users' personal attributes predictable using only the interactions on public posts?

To answer the question, the problem of the predictability of users' personal attributes in the context of social media pages, such as FACEBOOK® pages, is studied. There are several challenges regarding the data in FACEBOOK® pages. The first challenge is about the unavailability of users' connections. Based on the literature, users' connections play a vital role in predicting personal attributes. However, users' connections can be marked invisible using profile settings. Also, FACEBOOK® pages do not require users to form any kind of connection to interact with each other. The second challenge is about the text complexity. During the recent events across the globe including "Arab Spring", "Assam riots", and "Bangladesh Protests", FACEBOOK® users primarily communicated in their local languages such as Arabic, Assamese, and Bengali rather than English, which makes text data complex to analyze. Although interactions are pervasively available, only public posts are visible to everyone and all users can perform actions on them. This property of public posts results in extremely sparse public interaction data which further exacerbates the difficulty of the prediction problem. On the other hand, social theories including the homophily and consistency theories, have been developed to explain users' actions during interactions. The homophily theory suggests that similar users are likely to perform similar actions, while the consistency theory suggests that a user's action likely to remain consistent on similar posts. These social theories may be helpful in handling sparse interaction data. The present disclosure relates to a system and method for processing public and sparse interaction data including a novel framework to predict users' personal attributes from public interaction data.

Referring to the drawings, embodiments of a system for determining personal attributes based on public interaction data are illustrated and generally indicated as 100 in FIG. 1.

In one embodiment, the system 100 may employ a process for predicting personal attributes based on public interaction data as illustrated in the simplified block diagram of FIG. 1. At block 102, constructing matrices R, S, and P based on user interactions drawn from public posts on a social media website, such as FACEBOOK®. At block 104, learning a compact representation for a plurality of users based on public posts using matrices R, S, and P. At block 106, extracting the compact representation of one or more users that have been labeled. At block 108, applying a classifier to learn about a particular personal attribute. At block 110, predicting personal attributes of users that have not been labeled by applying learning.

In this disclosure, let $A \in R^{n \times m}$ be the matrix, where n is the number of rows and m is the number of columns. The entry at i-th column of A is denoted as A(i, j). A(i, :) and A(:, j) denote the i-th row and j-th column of A, respectively. $A_F$ is the Frobenius norm of A $$\|A\|_F = \sqrt{\Sigma_{i=1}^n \Sigma_{j=1}^m A(i,j)^2}.$$

Typically, two types of objects are involved in public interaction, i.e., users and public posts in Facebook pages. Let $u=\{U_1, U_2, \ldots, U_n\}$ be the set of users, and $v=\{V_1, V_2, \ldots, V_m\}$ be the set of public posts, where n and m are the total numbers of users and public posts, respectively. Depending on the social media site, users' interactions involve different types of actions. For example, FACEBOOK® users mainly perform three types of actions on public posts and their associated items including liking, commenting, and sharing. For each publicly known action, the user-post action matrix $R \in R^{n \times m}$, is constructed where R ij=1 if i-th user's perform the action to j-th post, otherwise 0. For the simplicity of discussion, it is assumed that R contains user-post like actions.

Users can control their personal data such as demographic profiles and personal posts including status updates, photos and videos via their profile settings to avoid unwarranted access. However, users' interactions in FACEBOOK® pages are beyond their control and are always available to the public. Therefore in this disclosure, it is asked—are users' personal attributes predictable using public interactions in Facebook pages? To answer this question, a task of predicting users' personal attributes with public interaction data has been designed.

The problem of predicting users' attributes has been extensively studied by the inventors. It assumes that there are N users in u labeled with N<n. We assume that $u_L=\{U_1, U_2, \ldots, U_n\}$ is a set of labeled users where $u_L$ is a subset of u. Let $Y_L \in R^{N \times K}$ be the label matrix of $u_L$ where K is the total number values of a given attribute. The vast majority of existing attribute prediction algorithms make use of users' personal data such as their personal posts or their social networks to obtain a predictor f to predict the attribute of users in $\{u \backslash u_L\}$. To seek an answer to the question of whether users' personal attributes are predictable using only public interaction data, the predictability of user's attribute with users' interactions to public posts has been investigated, which is formally stated as—Given users' public interactions on posts, the known attribute labels $Y_L$, we aim to learn a predictor f to automatically predict the attribute for unlabeled users i.e, $\{u \backslash u_L\}$.

System for Attribute Prediction

A user usually performs like actions with a small proportion of personal posts, resulting in a sparse user-post action relationships. One of the key differences between public and personal posts is that only friends can perform interactions on personal posts, whereas all users can perform interactions on public posts. Hence, interaction patterns on public posts are likely to be more sparse than personal posts. Thus, the problem of predicting the personal attributes from such sparse public interactions is more challenging for traditional classification methods including support vector machines (SVM), logistic regression, and naive Bayes. The system 100 aims to address the sparse interactions problem by learning a compact representation of users with the help of social theories. This compact representation is later used to build a predictor f to automatically predict the personal attributes.

Learning a Compact Representation

The low-rank matrix factorization-based method is one of the popular ways to obtain the compact representation of users. In this disclosure, a conventional matrix factorization model is used to obtain low rank representation of users. The matrix factorization model seeks a low rank representation $U \in R^{n \times d}$ with d<<n via solving following optimization problem.

$$\min_{U \geq 0, H \geq 0, V \geq 0} \|R - UHV^T\|_F^2, \quad (1)$$

where $V \in R^{m \times d}$ is a low-rank space representation of the set of public posts; and $H \in R$ captures the correlations between the low rank representations of users and public posts such as $R(l,j)=U(i, :)HV^T(j, :)$. To avoid over-fitting, smoothness regularization on U, H, and V is added into Eq. (1), and then, $$\min_{U \geq 0, H \geq 0, V \geq 0} \|R - UHV^T\|_F^2 + \lambda(\|U\|_F^2 + \|V\|_F^2 + \|H\|_F^2), \quad (2)$$

where λ is non-negative and introduced to control the capability of U, V and H. The learnt compact representation may be inaccurate because of the sparsity of W. The number of zero entities in R is much larger than that of non-zero numbers, which indicates that $U(i, :)HV^T(j, :)$ will fit to be zero. The extreme sparsity of R will result in the learnt representation U close to a zero matrix.

One way to mitigate the data sparsity challenge is to give different weights to the observed and missing actions. In detail, we introduce a weight matrix $W \in R^{n \times m}$ where W(i, j) is the weight to indicate the importance of Ra, (i, j) in the factorization process. The new formulation is presented in Eq. (2) as $$\min_{U \geq 0, H \geq 0, V \geq 0} \|W \odot (R - UHV^T)\|_F^2 + \lambda(\|U\|_F^2 + \|V\|_F^2 + \|H\|_F^2), \quad (3)$$

where O is the Hadamard product and (A O B)(i, j)=A(i, j)×B(i,j) for any two matrices A and B with the same size. W(i,j)=1 if R(i,j)=1. Following the suggestions in [11], we set W(i, j) to a small value close to zero when R(i, j)=O, which allows negative samples in the learning process. In this disclosure, W(i,j)=0.01 when R(i,j)=O.

In addition to like actions, users can perform other actions such as sharing and commenting. There are many social theories such as homophily and consistency theories developed to explain users' actions. These social theories pave a way for us to model user-user and post-post correlations, which can potentially further mitigate the data sparsity problem.

Modeling Correlations

User-user and post-post correlations in social media are widely used to improve various tasks such as feature selection, sentiment analysis and recommendation. In this disclosure, system 100 is used to compute the user-user and post-post correlations using users' actions on public posts and their associated items such as comments and shared posts. These correlations are exploited to tackle the sparsity problem further and more details are discussed in the following subsections.

Modeling User-User Correlations: Apart from likes, users also perform other actions including commenting, replying and sharing on different types of objects such as posts, shared posts, and comments. This subsection provides a way to include these users' activities by modeling user-user correlations. Homophily is one of the important social theories developed to explain users' actions during interactions in the real world. Homophily theory suggests that similar users are likely to perform similar actions. These intuitions motivate us to obtain low-rank space representation of users based on their historical actions during interactions. We define $\Psi(i, j)$ to measure the user-user correlation coefficients between $U_i$ and $U_j$. There are many ways to measure user-user correlation, such as similarity of users' behavior and connections in social networks. In this disclosure, the similarities of users' historical behavior are chosen to measure user-user correlations. A user can perform a variety of actions, including liking, commenting, and sharing. Hence, similarity is calculated as a function of the total amount of actions performed by two users together:

$$\Psi(i,j) = h(l(i,j), c(i,j), s(i,j)), \quad (4)$$

where $l(i,j)$, $c(i,j)$ and $s(i,j)$ record the number of likes, comments and shares, respectively, performed by Ui and Uj together. $h(\cdot)$ combines these users' behaviors together, which is defined as a sign function in this disclosure:

$$\Psi(i, j) = \begin{cases} 1 & \text{if } l(i, j) + c(i, j) + s(i, j) > 0, \\ 0 & \text{Otherwise.} \end{cases} \quad (5)$$

With $\psi(i, j)$, user-user correlations is modeled by minimizing the following term as $$\min_{U \geq 0} \sum_{i=1}^{n} \sum_{j=1}^{n} \Psi(i, j) \|U(i, :) - U(j, :)\|_2^2 \quad (6)$$

Users close to each other in the low-rank space are more likely to be similar and their distances in the latent space are controlled by their correlation coefficients. For example, $\psi(i, j)$ controls the latent distance between Ui and Uj. A larger value of $\psi(i, j)$ indicates that Ui and Uj are more likely to be similar. Thus, we force their latent representation as close as possible, while a smaller value of $\psi(i, j)$ tells that the distance of their latent representation should be larger.

For a particular user $U_i$, the terms in Eq. (6) related to her latent representation Ui are, $$\min_{U \geq 0} \sum_{j=1}^{n} \Psi(i, j) \|U(i, :) - U(j, :)\|_2^2 \quad (7)$$

It is shown that the latent representation of Li; is smoothed with other users, controlled by $^1 1^)(i, j)$, hence even for long tail users, with a few or even without any actions, we can still get an approximate estimate of their latent representation via user-user correlations, addressing the sparsity problem in Eq. (3).

After some derivations, we can get the matrix form of Eq. (6) as $$\frac{1}{2} \sum_{i=1}^{n} \sum_{j=1}^{n} \Psi(i, j) \|U(i, :) - U(j, :)\|_2^2 = \quad (8)$$

$$\frac{1}{2} \sum_{i=1}^{n} \sum_{j=1}^{n} \sum_{k=1}^{d} \Psi(i, j)(U(i, k) - U(j, k))^2 =$$

$$\sum_{i=1}^{n} \sum_{j=1}^{n} \sum_{k=1}^{d} \Psi(i, j) U^2(i, k) - \sum_{i=1}^{n} \sum_{j=1}^{n} \sum_{k=1}^{d} \Psi(i, j) U(i, k) U(j, k) =$$

$$\sum_{k=1}^{d} U^T(:, k)(D^u - S) U(:, k) = Tr(U^T \mathcal{L}^u U),$$

where $\mathcal{L} = D^u - S$ is the Laplacian matrix and $D^u$ is a diagonal matrix with the i-th diagonal element $D^u(i, i) = \Sigma_{j=1}^m \Psi(j, i)$. S is the user-user correlation matrix defined as $$S = \begin{pmatrix} \Psi(1, 1) & \Psi(1, 2) & \dots & \Psi(1, n) \\ \Psi(2, 1) & \Psi(2, 2) & \dots & \Psi(2, n) \\ \vdots & \vdots & \ddots & \vdots \\ \Psi(n, 1) & \Psi(n, 2) & \dots & \Psi(n, n) \end{pmatrix}$$

Modeling Post-Post Correlations: Apart from likes, posts also receive other actions including commenting and sharing from users. This subsection provides a way to include these activities on posts. Consistency is one of the important social theories developed to explain users' actions, which suggests that users' actions on similar posts are likely to remain consistent. These intuitions motivate us to obtain low-rank space representation of posts based on historical actions received by them. We define $\phi(i, j)$ to measure the post-post correlation between vi and vi. In this disclosure, the similarity of actions received by posts is chosen to measure post-post correlations. A post can receive a variety of actions, including liking, commenting, and sharing. Hence, similarity is calculated as a function of the total amount of actions received by two posts together:

$$\Phi(i,j) = g(l(i,j), c(i,j), s(i,j)), \quad (9)$$

where $l(i,j)$, $c(i,j)$, and $s(i,j)$ record the number of users who perform likes, comments and shares, respectively, on pi and pj together. $g(\cdot)$ combines these users' behaviors together, which is defined as a sign function in this paper:

$$\Phi(i, j) = \begin{cases} 1 & \text{if } l(i, j) + c(i, j) + s(i, j) > 0, \\ 0 & \text{Otherwise.} \end{cases} \quad (10)$$

With $\phi(i, j)$, post-post correlations are modeled by minimizing the following term as $$\min_{V\geq 0}\sum_{i=1}^{m}\sum_{j=1}^{m}\Phi(i,j)\|V(i,:)-V(j,:)\|_2^2 \qquad (11)$$

Posts close to each other in the low-rank space are more likely to be similar and their distances in the latent space are controlled by their correlation coefficients. For example, $\phi(i, j)$ controls the latent distance between vi and vj. A larger value of $\phi(i, j)$ indicates that vi and vj are more likely to be similar. These latent representations are forced to be as close as possible, while a smaller value of $\phi(i, j)$ tells that the distance of their latent representation should be larger.

For a particular post vi, the terms in Eq. (6) related to its latent representation Vi, are, $$\min_{V\geq 0}\sum_{j=1}^{m}\Phi(i,j)\|V(i,:)-V(j,:)\|_2^2 \qquad (12)$$

It is shown that the latent representation of v, is smoothed with other posts, controlled by ($\phi$i, j), hence even for long tail posts, with a few or even without any actions, we can still get an approximate estimate of their latent representation via post-post correlations, addressing the sparsity problem in Eq. (3).

By following the derivations in Eq. (8), we can get the matrix form of Eq. (11) as $$\frac{1}{2}\sum_{i=1}^{m}\sum_{j=1}^{m}\Phi(i,j)\|V(i,:)-V(j,:)\|_2^2 = \mathrm{Tr}(V^T\mathcal{L}^v V), \qquad (13)$$

were $\mathcal{L}^u = D^u - P$ is the Laplacian matrix and $D^u$ is a diagonal matrix with the i-th diagonal element $D^u(i, i) = \Sigma_{j=1}^{m}\phi(j, i)$. P is the post-post correlation matrix defined as $$P = \begin{pmatrix} \Phi(1,1) & \Phi(1,2) & \ldots & \Phi(1,n) \\ \Phi(2,1) & \Phi(2,2) & \ldots & \Phi(2,n) \\ \vdots & \vdots & \ddots & \vdots \\ \Phi(n,1) & \Phi(n,2) & \ldots & \Phi(n,n) \end{pmatrix}$$

The Proposed Algorithm to Learn Compact Representation

With the components of modeling user-user and post-post correlations, the algorithm is applied by the system 100 to solve the following optimization problem first.

$$\min_{U\geq 0, H\geq 0, V\geq 0}\|W\odot(R-UHV^T)\|_F^2 + \qquad (14)$$
$$\lambda(\|U\|_F^2 + \|V\|_F^2 + \|H\|_F^2) + \alpha\mathrm{Tr}(U^T\mathcal{L}_u U) + \beta\mathrm{Tr}(V^T\mathcal{L}_v V),$$

where the first term is used to exploit the available users' like actions on posts, second term captures user-user correlations, and post-post correlations are captured by third term. The parameter $\alpha$ and $\beta$ is introduced to control the contribution from user-user and post-post correlations, respectively.

The optimization problem in Eq. (14) is a multi-objective with respect to the three variables U, H and V together. A local minimum of the objective function J in Eq. (14) can be obtained through an alternative scheme.

Computation of H.

Optimizing the objective function in Eq. (14) with respect to H is equivalent to solving $$\min_{H\geq 0}\mathcal{J}_H = \|W\odot(R-UHV^T)\|_F^2 + \lambda\|H\|_F^2 \qquad (15)$$

Let $\lambda H$ be the Lagrange multiplier for constraint $H\geq 0$. the Lagrange function $L(\tilde{H})$ is defined as follows:

$$L(H) = \|W\odot(R-UHV^T)\|_F^2 + \lambda\|H\|_F^2 - \mathrm{Tr}(\lambda_H H^T) \qquad (16)$$

By setting the derivative $\nabla_H L(H) = 0$, we get $$\lambda_H = -2U^T(W\odot W\odot R)V + 2U^T(W\odot W\odot UHV^T)V + 2\lambda H \qquad (17)$$

The Karush-Kuhn-Tucker complementary condition [17] for the non-negativity constraint of H gives $$\lambda_H(i,j)H(i,j) = 0 \qquad (18)$$

Thus, the following is obtained $$[-U^T(W\odot W\odot R)V + U^T(W\odot W\odot UHV^T)V + \lambda H](i,j) = 0 \qquad (19)$$

This leads to the updating rule of H, $$H(i,j) \leftarrow H(i,j) * \sqrt{\frac{[U^T(W\odot W\odot R)V](i,j)}{[U^T(W\odot W\odot UHV^T)V + \lambda H](i,j)}} \qquad (20)$$

Computation of U.

Similar to the computation of H, optimizing the objective function in Eq. 14 with respect to U is equivalent to solving $$\min_{U\geq 0}\mathcal{J}_U = \|W\odot(R-UHV^T)\|_F^2 + \lambda\|U\|_F^2 + \alpha\mathrm{Tr}(U^T\mathcal{L}^u U) \qquad (21)$$

Let $\lambda_U$ be the Lagrange multipliers for constraint $U\geq 0$. The Lagrange function $L_{(U)}$ is defined as follows:

$$L(U) = \|W\odot(R-UHV^T)\|_F^2 + \lambda\|U\|_F^2 + \alpha Tr(U^T\mathcal{L}^u U) - Tr(\lambda_U U^T) \qquad 22)$$

By setting the derivative $\nabla_U L(U) = 0$ we get $$\lambda_U = -2(W\odot W\odot R)VH^T + 2\lambda U + 2\alpha(F_u - S(U+2)$$
$$W\odot W\odot UHV^T)VH^T \qquad (23)$$

The Karush-Kuhn-Tucker complementary condition for the non-negativity constraint of U gives $$\lambda_U(i,j)U(i,j) = 0 \qquad (24)$$

Thus, the following is obtained $$[-(W\odot W\odot R)VH^T + 2\lambda U + \alpha(D_u - S)U + (W\odot W\odot UHV^T)$$
$$VH^T](i,j)U(i,j) = 0 \qquad (25)$$

Similar to [10], it leads to the updating rule of U, $$U(i,j) \leftarrow U(i,j) * \sqrt{\frac{[(W\odot W\odot R)VH^T + \alpha SU](i,j)}{[(W\odot W\odot UHV^T)VH^T + \alpha D_u U + \lambda U](i,j)}} \qquad (26)$$

Computation of V.

Similarly, optimizing the objective function in Eq. (14) with respect to V leads to the updating rule of V, $$V(i,j) \leftarrow V(i,j) * \sqrt{\frac{[(W\odot W\odot R)^T UH + \beta PV](i,j)}{[(W\odot W\odot UHV^T)^T UH + \beta D_v V + \lambda V](i,j)}} \qquad (27)$$

It can be proven that updating rules in Eq. (20), Eq. (26) and Eq. (27) are guaranteed to converge. To save space, the detailed proof of the convergence of the updating rules is omitted in Eq. (20), Eq. (26) and Eq. (27).

In summary, we present the computational algorithm for optimizing Eq. (14) in Algorithm 1. In the algorithm, we conduct initialization of two Laplacian matrices, and random initialization of three matrices to be inferred from lines 1 and 2. $T$ is the number of maximum iterations. The three matrices are updated with the updating rules until convergence or reaching the number of maximum iterations. The correctness and convergence of the updating rule can be proved with standard auxiliary function approach.

Building a Classifier for Attribute Prediction

After obtaining the low-rank representation of U by Algorithm 1, a linear Support Vector Machine (SVM) classifier is chosen as the basic classifier for the attribute prediction task.

Next we briefly review the above algorithm. In line 1, we learn the compact representation by Algorithm 1, and in line 3, we train a SVM classifier based on the representation of the labeled users $U_L$ and their labels $Y_L$. Note that system 100 uses SVM as the basic classifier which only takes discrete values as labels such as gender, interested-in, relationship status, and religious affiliations etc. For a continuous valued attribute such as age, a discretization is performed for SVM.

---

Algorithm 1:
The Proposed Algorithm to Learn Compact Representation

Input: R, S, P, d, λ, α, β, T
Output: U, V
1:    Construct matrices $L_u$ and $L_v$ in Eq. 8 and 13
2:    Initialize matrices U, V and H randomly
3:    while Not convergent and t ≤ T do 4:
$$\text{Update } H(i,j) \leftarrow H(i,j) \sqrt{\frac{[U^T(W \odot W \odot R)V](i,j)}{[U^T(W \odot W \odot UHV^T)V + \lambda H](i,j)}}$$

5:    Update
$$U(i,j) \leftarrow U(i,j) \sqrt{\frac{[(W \odot W \odot R)VH^T + \alpha SU](i,j)}{[(W \odot W \odot UHV^T)VH^T + \alpha D_u U + \lambda U](i,j)}}$$

6:    Update
$$V(i,j) \leftarrow V(i,j) \sqrt{\frac{[(W \odot W \odot R)^T UH + \beta PV](i,j)}{[(W \odot W \odot UHV^T)^T UH + \beta D_v V + \lambda V](i,j)}}$$

7:    t = t + 1
8:    end while

---

Algorithm 2: The system 100.

Input: R, S, P λ, α, β, T, and $Y_L$
Output: A SVM Classifier $f$
    1: Learn the compact representation U for u by Algorithm 1;
    2: Obtain the compact representation $U_L$ for the labeled users $u_L$;
    3: Train a SVM classifier $f$ with $U_L$ and $Y_L$;

---

Experiments

Experiments were conducted to answer the following two questions—(1) can the proposed framework predict users' attributes from public interaction data? and (2) is it necessary to learn a compact representation? After the introduction of experimental settings, experiments were designed to answer above two questions and finally perform analysis for the important parameters of the system 100.

Facebook Datasets

For experiments, a FACEBOOK® dataset was collected consisting of users' interactions on the "Basher Kella" Page[3] during the recent events of the Bangladesh protests[4]. The "Basher Kella" Facebook page represents the influential political organization in Bangladesh which also has the records of supporting violence[5]. This FACEBOOK® page' was found on Mar. 7, 2013. From Mar. 7, 2013 till Apr. 21, 2013, FACEBOOK users' actions were collected on all the posts published on this page.

TABLE I

| SFD | |
|---|---|
| # of days crawl | 47 |
| # of users | 498,674 |
| # of public posts | 9,907 |
| Avg # of Likes per user | 15.87 |
| Avg # of Likes per post | 580.10 |
| Avg # of Comments per user | 1.20 |
| Avg # Comments per post | 44.11 |
| Avg # of Shares per user | 2.79 |
| Avg # of Shares per post | 139.89 |

Originally, 42,599 public posts were collected and the administrators of this page contribute 23.25% (9907) of the total number of posts (admin-posts). As expected, users' actions on the admin-posts were significantly higher than the posts from other FACEBOOK® users. Majority of the posts from other users contains no actions. Therefore, only public posts were used from the administrators of the page in this experiment. For each post, all the users who like, comments and shares the post were collected. For each comment on a post, the inventors collected all the users who like, and reply to the comment of that post. For each reply, the inventors collected all the users who like that reply. For each share, the inventors collected all the users who like and comment on that share. Finally, for each comment on a share, the inventors also collected users who like, and reply that comment on the share. Also, for each reply on a share comment, the inventors collected all the users who like that reply on the share comment. Table I shows the overall statistics of the dataset.

In the experiment, three attributes, i.e., religious affiliation, relationship status and interested-in preference, were chosen. For the religious affiliation attribute to establish the ground truth for evaluation, we first use the FACEBOOK® graph search results to examine the set of users who set the attribute available to the public and then collect the attributes of these users with their public interaction data to establish a dataset, FACEBOOK®-religion, to assess the performance of the proposed framework. The statistics of FACEBOOK®-religion is shown in Table H. The inventors determined from the experiment that only a small portion of users (2853 out of 42,599) who set their religious affiliation publicly available. The inventors obtained five values for religious affiliation, i.e., Muslim, Atheist, Buddhist, Hindu, or Christian and these five religions are indeed the top five religions in Bangladesh based on their populations[7]. To assess the performance of the proposed framework with other attributes, we also choose another two attributes, relationship status and interested-in preference. For each of these two attributes, following a similar process, the inventors built a dataset based on 2853 users. The statistics of FACEBOOK®-relation and FACEBOOK®-interest are shown in III and IV, respectively. For relationship status, we consider two values, single and not-single. All the FACEBOOK® users with relation status values as "married", "engaged" and "in a relationship" are considered not-single, whereas "single", "widowed", and "divorced" are considered single. The inventors considered three values for interested-in preference such as users who like men, users who like women, and users who like both men and women.

For each dataset, the inventors chose x % of the dataset for training and the remaining (1−x) % as testing. In this work, we vary X as {50, 60, 70, 80, 90}. For each x, the inventors repeated the experiments five times and reported the average performance.

From the evaluation perspective, precision and recall are equally important for the prediction task. For example, in an Islamic country like Bangladesh, the cost of incorrectly predicting someone as atheist could be disastrous, as it carries connotations of blasphemy. However, precision, recall, and FI-score are biased towards one of the labels. Hence, it is unsuitable for our unbalanced evaluation dataset. For this purpose, the inventors used commonly adopted macro-average FI score to assess the prediction performance, as it gives equal weight to all the labels.

TABLE II

SF-D

| Religion | # of Users | Percentage (%) |
|---|---|---|
| Muslim | 1866 | 65.40 |
| Atheist | 216 | 7.57 |
| Buddhist | 113 | 3.96 |
| Hindu | 463 | 16.23 |
| Christian | 195 | 6.84 |
| Total | 2853 | 100 |

TABLE III

SF-D

| Values | # of Users | Percentages (%) |
|---|---|---|
| Single | 760 | 65.01 |
| Not-single | 409 | 34.99 |
| Total | 1169 | 100 |

The macro-average FI score is defined as, $$\text{macro} - F1 = \frac{\sum_{i=1}^{K} F_i}{K}, \text{ where } F_i = \frac{2 p_i r_i}{p_i + r_i}, \quad (28)$$

where pi and ri refer to the precision and recall values associated with the i-th label, respectively. Note that F-score cannot be computed for a baseline which always picks the majority label for the prediction.

Performance Evaluation

In this subsection, experiments were conducted to answer the first question—can the system 100 predict users' personal attributes from users' public interaction data? To answer this question, the inventors investigated the performance of the proposed framework by comparing it with the random performance. For system 100, the inventors chose the cross-validation to determine the parameter values and more details about the parameter analysis will be discussed in the following subsection. The number of latent dimensions d was empirically set to 50. The performance results for FACEBOOK®-religion, FACEBOOK®-relation and FACEBOOK®-interest are demonstrated in FIGS. 2, 3 and 4, respectively.

Figure 2:
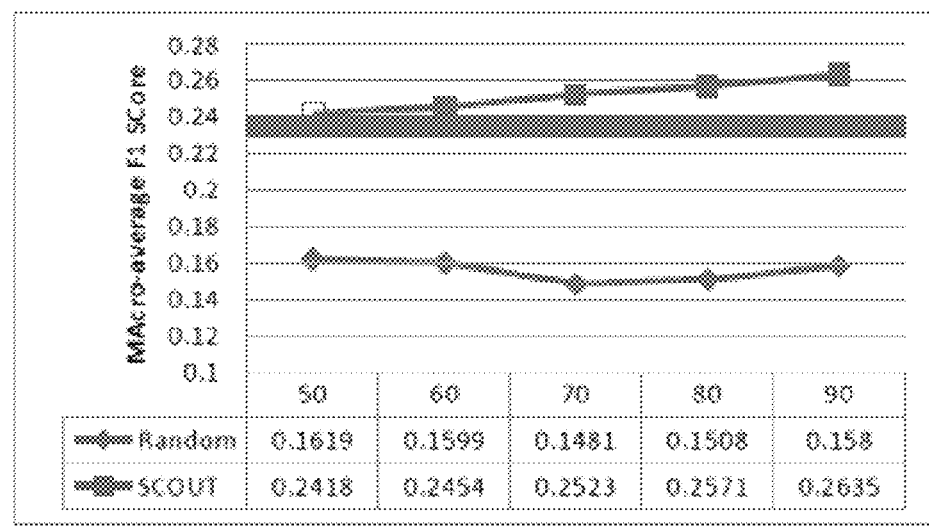
FIG. 2 is a graph showing the performance of the framework in predicting religious affiliation.
Figure 3:
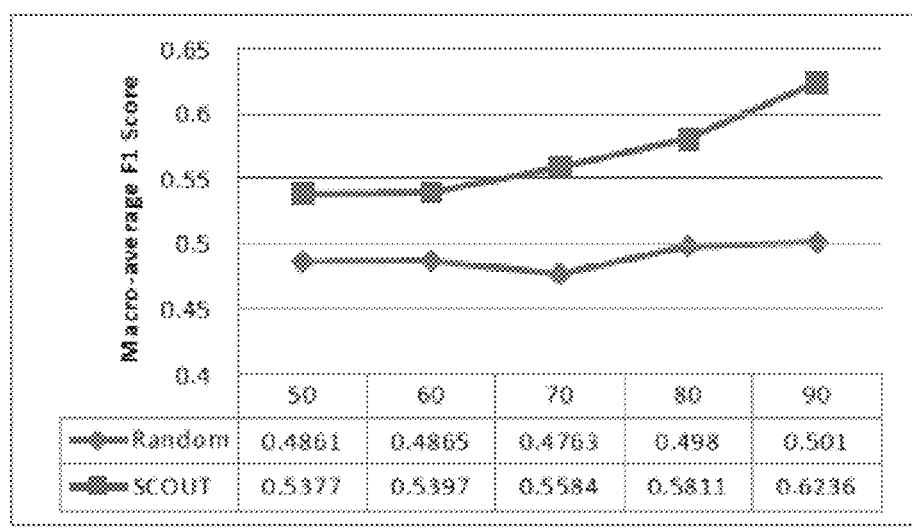
FIG. 3 is a graph showing the performance of the framework in predicting relationship status.
Figure 4:
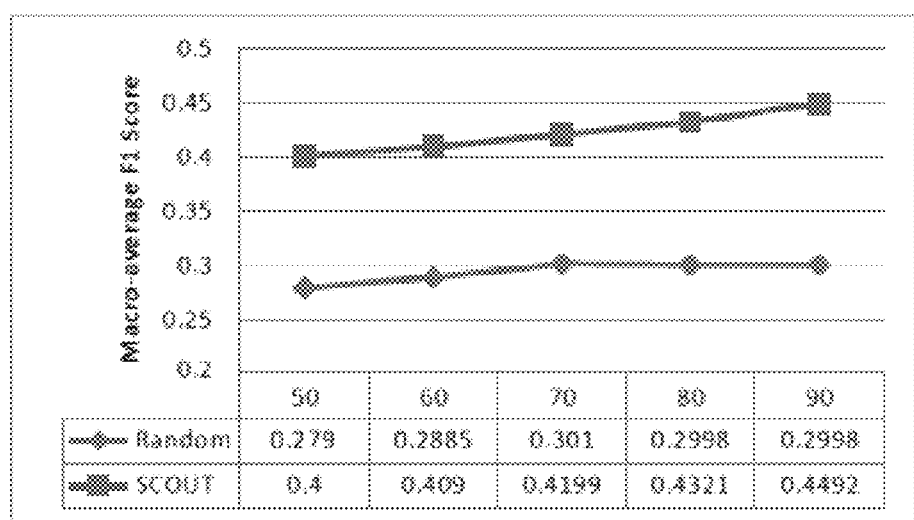
FIG. 4 is a graph showing the performance of the framework in predicting interested-in preference.

The following observations were made:

For all the FIGS. 2, 3, and 4, the performance of the system 100 increases with the increase of x. This is due to the fact that more training data helps to build a better SVM classifier.

The system 100 was found to consistently outperform the random method. The algorithm gains up to 70.49% and 49.83% relative improvement in FACEBOOK®-religion and FACEBOOK®-interest, respectively. The inventors conducted a t-test on these results and the evidence from t-test suggests that the improvement is significant. These results support that users' personal attributes are predictable from public interaction data. In the following subsections, we will investigate the contributions from different components to this improvement.

TABLE IV

THE STATISTICS FOR FACEBOOK-INTEREST DATASET

| Values | # of Users | Percentages (%) |
|---|---|---|
| Likes Men | 196 | 9.65 |
| Likes Women | 507 | 24.96 |
| Likes both Men and Women | 1328 | 65.39 |
| Total | 2031 | 100 |

In conclusion, above results suggest a positive answer to the first questions—the proposed framework can predict various users' personal attributes from public interaction data.

Impact of the Learnt Compact Representation

As mentioned above, the public interaction data representation matrix R is very sparse and we proposed an algorithm to learn a compact representation U with the help of social theories. In this subsection, the inventors studied the impact of the compact representation on the performance of the system 100 to answer the second question. In detail, inventors defined the following variants:

SCOUT (e.g., system 100)-Corr: Eliminate the impact of the user-user and post-post correlations by setting $\alpha=\beta=0$ in Eq. (14);

SCOUT-Corr-W: Eliminate the effects from both the correlation and the weight matrix W by setting $\alpha=\beta=0$ and W to be a matrix with all entities equal to 1 in Eq. (14); and SCOUT-R: Eliminate the impact of the compact representation by learning the SVM classifier with the original matrix R.

Figure 5:
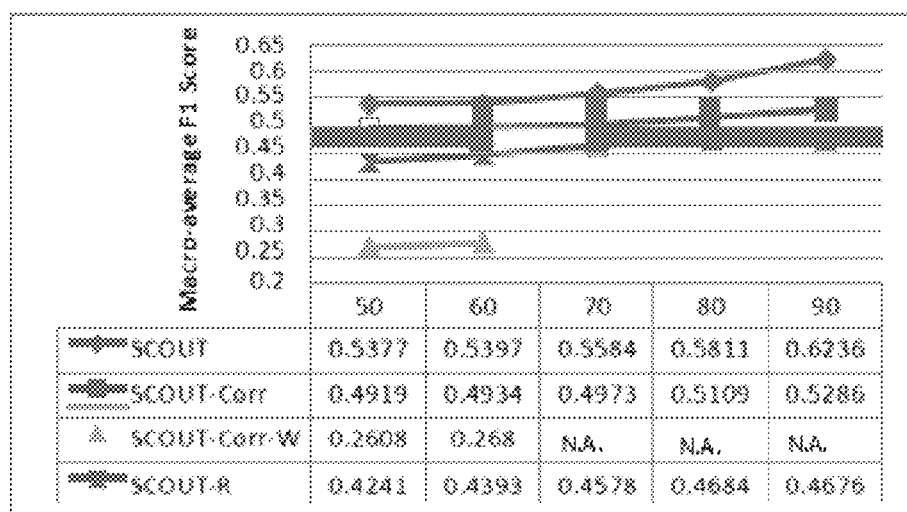
FIG. 5 is a graph showing the impact of the learnt compact representation on the framework.

The inventors only show results on FACEBOOK®-relation in FIG. 5 since we have similar observations with other settings. Note that sometimes the classifier gives the majority prediction and macro-F 1 cannot be computed in this situation; hence we use "N.A." to denote the performance in the table. When eliminating the impact of the user-user and post-post correlations, the performance of SCOUT-Corr is reduced, which indicates the importance of incorporating these correlations based on social theories. When eliminating these correlations and the weight matrix W, a traditional matrix factorization algorithm learns the compact representation and the performance of SCOUT-Corr-W reduces dramatically. As mentioned before, the extreme sparsity of R will lead to the learned compact representation close to zero. When building the classifier based on the sparse matrix R, the performance of SCOUT-R also reduces a lot. A good classifier cannot be learned based on the sparse and high-dimensional matrix R, which directly supports the importance of learning a compact representation for users.

In conclusion, the learned compact representation can mitigate the sparsity problem of public interaction data and plays an important role in the performance improvement of the proposed framework, which correspondingly answers the section question.

Impact of User-User and Post-Post Correlations

Figure 6:
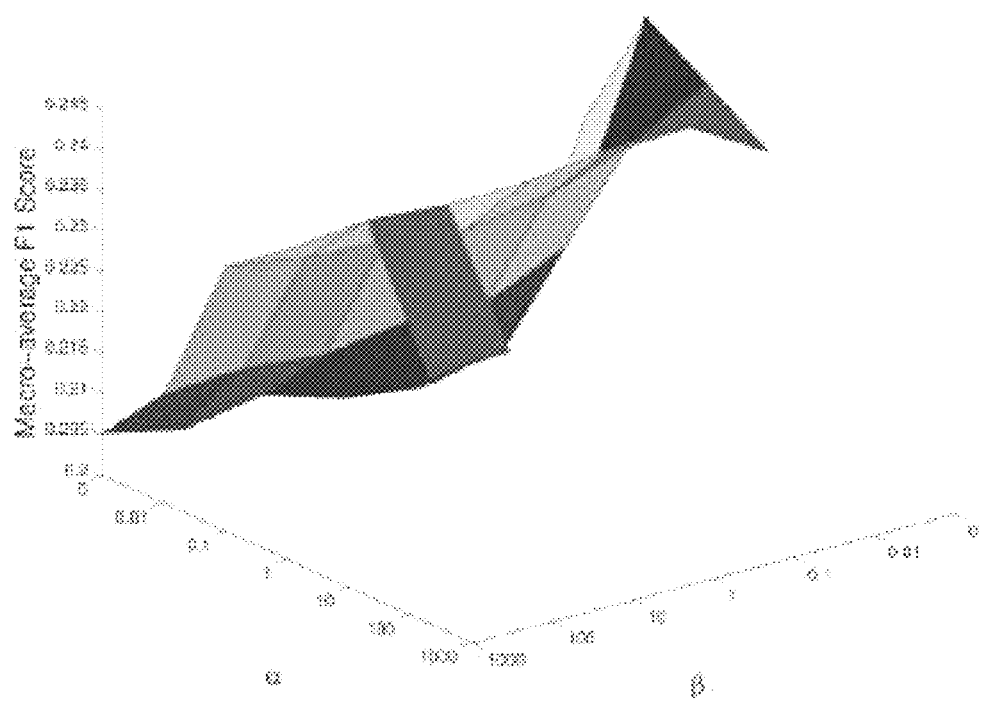
FIG. 6 is a graph illustrating the impact of user-user and post-post correlations on predicting religious affiliations, respectively.

The parameters $\alpha$ and $\beta$ are introduced to control the contributions from user-user and post-post correlations for our proposed framework SCOUT. Therefore, the inventors investigated the impact of user-user and post-post correlations via analyzing how the changes in affect the performance of SCOUT in terms of the attribute prediction. The value of $\alpha$ and $\beta$ was varied as $\{0, 0.01, 0.1, 1, 10, 100, 1000\}$. The results are shown in FIG. 6 for FACEBOOK®-religion. The inventors ignored the results with other settings since similar observations have been obtained.

In general, with the increase of $\alpha$ and $\beta$, the inventors observed similar patterns: first increasing, reaching its peak value and then degrading rapidly. These patterns can be used to determine the optimal value of $\alpha$ and $\beta$ for system 100 in practice. In particular the following can be observed;

When $\alpha$ is increased from zero, eliminating the impact of user-user correlations to system 100, to 0.1, the performance improves, suggesting the importance of user-user correlations in the system 100 to mitigate the data sparsity problem.

When $\beta$ is increased from zero, eliminating the impact of post-post correlations to system 100, to 0.01, the performance improves, suggesting the importance of post-post correlations in the system 100.

System 100 achieves its best performance when a $\alpha=0.1$ and $\beta=0.01$, further demonstrating the importance of user-user and post-post correlations in system 100.

From $\alpha=0.1$ and $\beta=0.01$, the performance decreases rapidly, In comparison, performance decrease is not rapid from $\beta=0.01$ to $\beta=1000$. When $\alpha$ and $\beta$ are very large, user-user and post-post correlations dominate the learning process and the learned representation is inaccurate.

Figure 7:
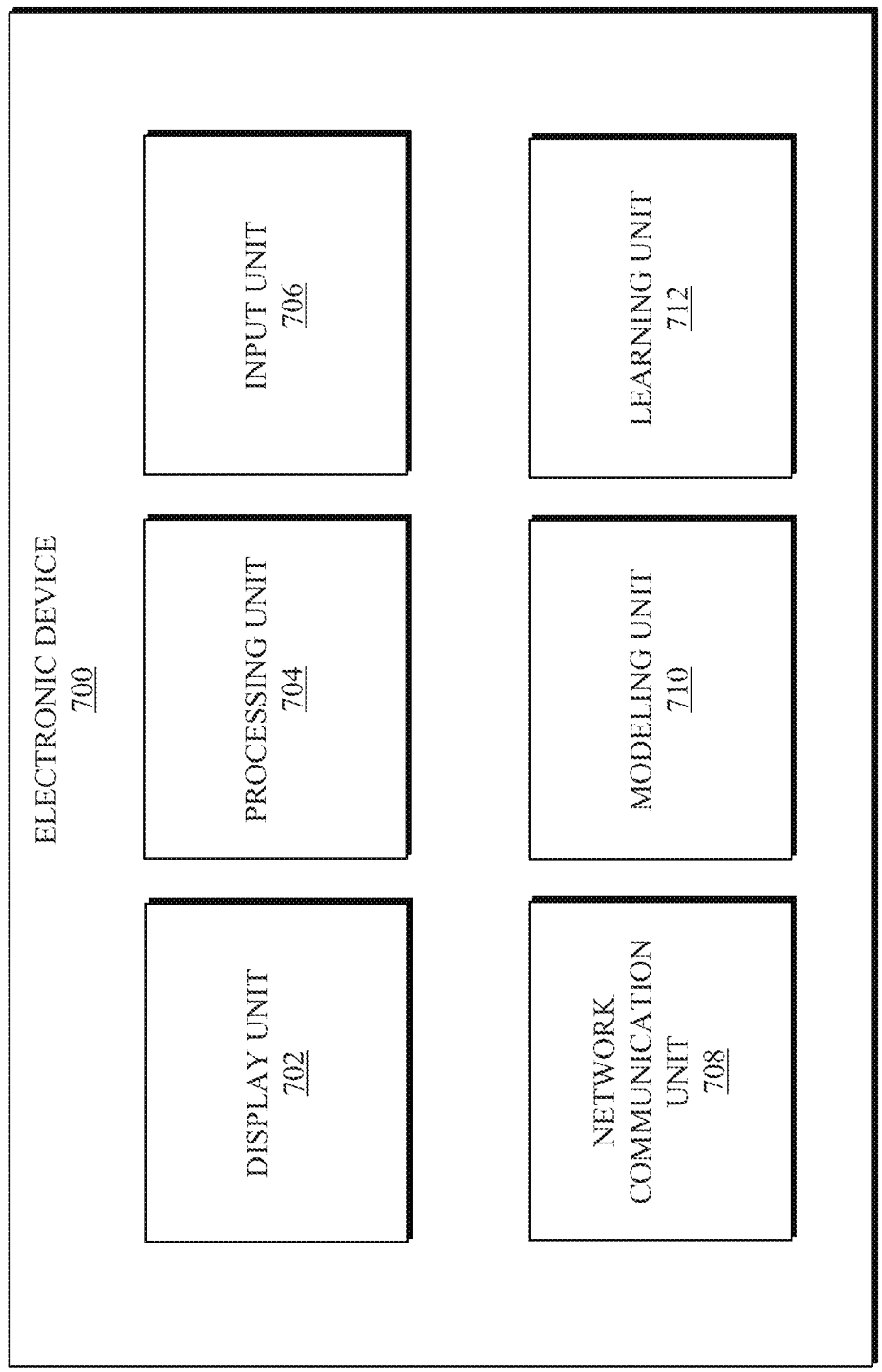
FIG. 7 is a simplified block diagram of an electronic device.

Turning to FIG. 7, an example electronic device 700 including operational units 702-712 arranged to perform various operations of the presently disclosed technology is shown. The operational units 702-712 of the device 700 are implemented by hardware or a combination of hardware and software to carry out the principles of the present disclosure. It will be understood by persons of skill in the art that the operational units 702-712 described in FIG. 7 may be combined or separated into sub-blocks to implement the principles of the present disclosure. Therefore, the description herein supports any possible combination or separation or further definition of the operational units 702-712.

In one implementation, the electronic device 700 includes a display unit 702 configured to display information, such as a graphical user interface, and a processing unit 704 in communication with the display unit and an input unit 706 configured to receive data from one or more input devices or systems. Various operations described herein may be implemented by the processing unit 704 using data received by the input unit 706 to output information for display using the display unit 702. In one particular implementation, the predicted attribute of a user of a website or other publicly available data store is displayed on the display unit 702 for a user of the electronic device 700 to view.

Additionally, in one implementation, the electronic device 700 includes units implementing the operations described with respect to FIG. 1. For example, the electronic device 700 may include a network communication unit 708 for communicating with one or more servers of a public network to obtain information from the public network, as in operation 102 of FIG. 1. For example, the network communication unit 708 may access the public network (such as the Internet) to obtain information from one or more public websites. Such information may include public posts made by users of the public website and/or public interactions to such posts from the users. A modeling unit 710 may also be included in the electronic device 700 to model correlations to one or more matrices of interactions from the publicly available network. Further still, the electronic device 700 may include a learning unit 712 to learn compact representations for users and posts using the matrices as described above with relation to operation 104 of FIG. 1 and other locations, among other learning functions. Additional units may also be included but are not shown, such as an SVM classifier application unit for applying a SVM classifier for a given attribute and/or an extraction unit for extracting compact representations for users of the constructed matrices.

Figure 8:
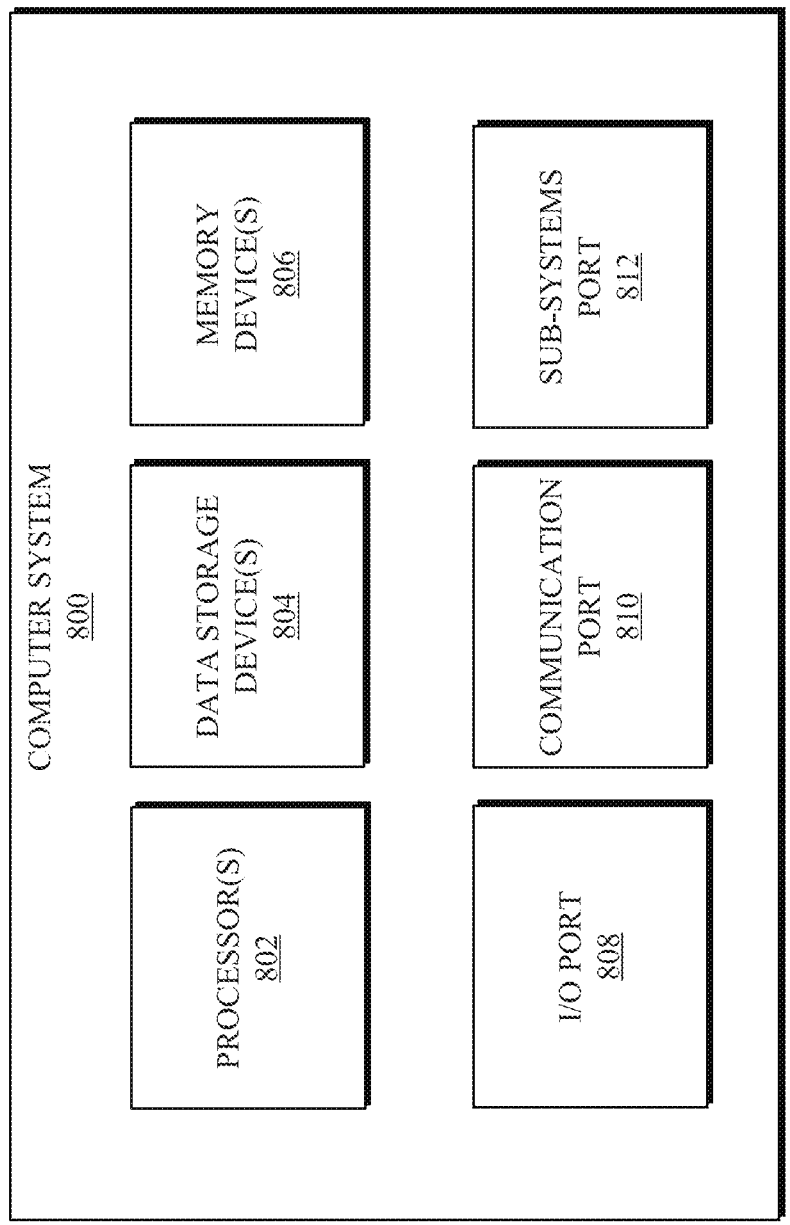
FIG. 8 is a simplified block diagram of a computer system.

Referring to FIG. 8, a detailed description of an example computing system 800 having one or more computing units that may implement various systems and methods discussed herein is provided. The computing system 800 may be applicable to the system 100 and other computing or network devices. It will be appreciated that specific implementations of these devices may be of differing possible specific computing architectures not all of which are specifically discussed herein but will be understood by those of ordinary skill in the art.

The computer system 800 may be a computing system is capable of executing a computer program product to execute a computer process. Data and program files may be input to the computer system 800, which reads the files and executes the programs therein. Some of the elements of the computer system 800 are shown in FIG. 8, including one or more hardware processors 802, one or more data storage devices 804, one or more memory devices 806, and/or one or more ports 808-812. Additionally, other elements that will be recognized by those skilled in the art may be included in the computing system 800 but are not explicitly depicted in FIG. 8 or discussed further herein. Various elements of the computer system 800 may communicate with one another by way of one or more communication buses, point-to-point communication paths, or other communication means not explicitly depicted in FIG. 8.

The processor 802 may include, for example, a central processing unit (CPU), a microprocessor, a microcontroller, a digital signal processor (DSP), and/or one or more internal levels of cache. There may be one or more processors 802, such that the processor comprises a single central-processing unit, or a plurality of processing units capable of executing instructions and performing operations in parallel with each other, commonly referred to as a parallel processing environment.

The computer system 800 may be a conventional computer, a distributed computer, or any other type of computer, such as one or more external computers made available via a cloud computing architecture. The presently described technology is optionally implemented in software stored on the data stored device(s) 804, stored on the memory device(s) 806, and/or communicated via one or more of the ports 808-812, thereby transforming the computer system 800 in FIG. 8 to a special purpose machine for implementing the operations described herein. Examples of the computer system 800 include personal computers, terminals, workstations, mobile phones, tablets, laptops, personal computers, multimedia consoles, gaming consoles, set top boxes, and the like.

The one or more data storage devices 804 may include any non-volatile data storage device capable of storing data generated or employed within the computing system 800, such as computer executable instructions for performing a computer process, which may include instructions of both application programs and an operating system (OS) that manages the various components of the computing system 800. The data storage devices 804 may include, without limitation, magnetic disk drives, optical disk drives, solid state drives (SSDs), flash drives, and the like. The data storage devices 804 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 804 and/or the memory devices 806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 800 includes one or more ports, such as an input/output (I/O) port 808, a communication port 810, and a sub-systems port 812, for communicating with other computing, network, or vehicle devices. It will be appreciated that the ports 808-812 may be combined or separate and that more or fewer ports may be included in the computer system 800.

The I/O port 808 may be connected to an I/O device, or other device, by which information is input to or output from the computing system 800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 800 via the I/O port 808. Similarly, the output devices may convert electrical signals received from computing system 800 via the I/O port 808 into signals that may be sensed as output by a human, such as sound, light, and/or touch. The input device may be an alphanumeric input device, including alphanumeric and other keys for communicating information and/or command selections to the processor 802 via the I/O port 808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 810 is connected to a network by way of which the computer system 800 may receive network data useful in executing the methods and systems set out herein as well as transmitting information and network configuration changes determined thereby. Stated differently, the communication port 810 connects the computer system 800 to one or more communication interface devices configured to transmit and/or receive information between the computing system 800 and other devices by way of one or more wired or wireless communication networks or connections. For example, the computer system 800 may be instructed to access information stored in a public network, such as the Internet. The computer 800 may then utilize the communication port to access one or more publicly available servers that store information in the public network. In one particular embodiment, the computer system 800 uses an Internet browser program to access a publicly available website. The website is hosted on one or more storage servers accessible through the public network. Once accessed, data stored on the one or more storage servers may be obtained or retrieved and stored in the memory device(s) 806 of the computer system 800 for use by the various modules and units of the system, as described herein.

Examples of types of networks or connections of the computer system 800 include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 810 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 810 may communicate with an antenna for electromagnetic signal transmission and/or reception.

The computer system 800 may include a sub-systems port 812 for communicating with one or more additional systems to perform the operations described herein. For example, the computer system 800 may communicate through the sub-systems port 812 with a large processing system to perform one or more of the calculations discussed above.

The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

In summary appropriate incorporation of user-user and post-post correlations into the dimension reduction algorithm can greatly improve the prediction performance of personal attributes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for predicting personal attributes from publicly available data, the method comprising:
   accessing, at a computing device, a public network through a network interface to obtain public interaction data stored on the public network, the public interaction data corresponding to a plurality of users of the public network and comprising interactions with a plurality of public posts stored in the public network by the plurality of users;
   learning, by the computing device, a compact representation of user-user and post-post correlations using only the public interaction data, by
      constructing two Laplacian matrices,
      randomly initializing a set of three matrices,
      optimizing a plurality of objective functions derived from information associated with the two Laplacian matrices and the set of three matrices to generate a plurality of updating rules,
      updating the set of three matrices with the plurality of updating rules until convergence or reaching a predetermined number of maximum iterations, and
      outputting the compact representation including a representation of labeled users and labels associated with the labeled users;
   training a classifier for attribute prediction based on the labeled users and labels associated with the labeled users as defined by the compact representation; and
   applying the classifier to additional public interaction data to predict a personal attribute of an unlabeled user associated with the additional public interaction data.

2. The method of claim 1 further comprising:
   deriving the compact representation by applying a function to the public interaction data that defines a plurality of input variables, each of the plurality of input variables corresponding to one of the set of three matrices.

3. The method of claim 1 wherein the classifier is a linear support vector machine (SVM) classifier.

4. The method of claim 1 wherein the interactions with the plurality of public posts stored in the public network by the plurality of users includes at least one of an approval indication, a comment, and sharing of at least one of the plurality of the public posts.

5. The method of claim 1 further comprising:
   modeling correlations of similarities in a historical behavior of the plurality of users of the public network in a user-user correlation.

6. The method of claim 1 further comprising:
   modeling correlations of similarities of interactions received by the plurality of public posts stored in the public network in a post-post correlation.

7. The method of claim 1 wherein the particular personal attribute is at least one of gender, relationship status, age, and religious affiliation of the subset of the plurality of users of the public network.

8. The method of claim 1 wherein the public network is the Internet and the public interaction data is accessed through a publicly available social media website.

9. A computer system for predicting personal attributes from publicly available data, the system comprising:
   a processing device;
   a network interface for communicating with a public network; and
   a non-transitory storage medium with one or more executable instructions stored thereon, wherein the processing device executes the one or more instructions to perform the operations of:
   accessing the public network through the network interface to obtain public interaction data stored on the public network, the public interaction data corresponding to a plurality of users of the public network and comprising interactions with a plurality of public posts stored in the public network by the plurality of users;
   learning a compact representation for the plurality of users of the public network, by
      constructing two Laplacian matrices,
      randomly initializing a set of three matrices,
      optimizing a plurality of objective functions derived from information associated with the two Laplacian matrices and the set of three matrices to generate a plurality of updating rules,
      updating the set of three matrices with the plurality of updating rules until convergence or reaching a predetermined number of maximum iterations, and
      outputting the compact representation including a representation of labeled users and labels associated with the labeled users;
   training a classifier based on labeled users and associated labels defined by the compact representation; and
   applying the classifier to predict a personal attribute.

10. The system of claim 9 further comprising:
a display device displaying the predicted personal attribute of the subset of the plurality of users of the public network.

11. The system of claim 9 wherein the classifier is a linear support vector machine (SVM) classifier.

12. The system of claim 9 wherein the interactions with the plurality of public posts stored in the public network by the plurality of users includes at least one of an approval indication, a comment, and sharing of at least one of the plurality of the public posts.

13. The system of claim 9 wherein the one or more executable instructions further cause the processing device to perform the operations of comprising:
modeling correlations of similarities in a historical behavior of the plurality of users of the public network in a user-user correlation.

14. The system of claim 9 wherein the one or more executable instructions further cause the processing device to perform the operations of comprising:
modeling correlations of similarities of interactions received by the plurality of public posts stored in the public network in a post-post correlation.

15. The system of claim 9 wherein the particular personal attribute is at least one of gender, relationship status, age, and religious affiliation of the subset of the plurality of users of the public network.

16. The system of claim 9 wherein the public network is the Internet and the public interaction data is accessed through a publicly available social media website.

17. One or more non-transitory tangible computer-readable storage media storing computer-executable instructions for performing a computer process on a machine, the computer process comprising:
accessing, at a computing device, a public network through a network interface to obtain public interaction data stored on the public network, the public interaction data corresponding to a plurality of users of the public network and comprising interactions with a plurality of public posts stored in the public network by the plurality of users;
learning a compact representation for the plurality of users of the public network, by
constructing two Laplacian matrices,
randomly initializing a set of three matrices,
optimizing a plurality of objective functions derived from information associated with the two Laplacian matrices and the set of three matrices to generate a plurality of updating rules,
updating the set of three matrices with the plurality of updating rules until convergence or reaching a predetermined number of maximum iterations, and
outputting the compact representation including a representation of labeled users and labels associated with the labeled users;
training a classifier based on labeled users and associated labels defined by the compact representation; and
applying the classifier to the compact representation for a particular personal attribute of at least one of the plurality of users to predict a personal attribute of a subset of the plurality of users of the public network.

18. The one or more non-transitory tangible computer-readable storage media of claim 17 for performing a computer process on a machine, the computer process further comprising:
displaying the predicted personal attribute of the subset of the plurality of users of the public network on a display device of the computing device.

19. The one or more non-transitory tangible computer-readable storage media of claim 17 for performing a computer process on a machine, the computer process further comprising:
modeling correlations of similarities in a historical behavior of the plurality of users of the public network in a user-user correlation.

20. The one or more non-transitory tangible computer-readable storage media of claim 17 for performing a computer process on a machine, the computer process further comprising:
modeling correlations of similarities of interactions received by the plurality of public posts stored in the public network in a post-post correlation.

* * * * *